(No Model.)

J. T. HAMILTON.
HARROW.

No. 408,234. Patented Aug. 6, 1889.

Witnesses:
O. H. Stiles
N. P. Smith

Inventor:
James T. Hamilton,
By Thomas G. Orwig, Atty.

UNITED STATES PATENT OFFICE.

JAMES T. HAMILTON, OF COUNCIL BLUFFS, IOWA.

HARROW.

SPECIFICATION forming part of Letters Patent No. 408,234, dated August 6, 1889.

Application filed November 30, 1888. Serial No. 292,347. (No model.)

*To all whom it may concern:*

Be it known that I, JAMES T. HAMILTON, a citizen of the United States of America, residing at Council Bluffs, in the county of Pottawattamie and State of Iowa, have invented a new and useful Improvement in Drag-Harrows, of which the following is a specification.

My object is to simplify the construction, reduce the cost, facilitate the fastening and detaching of teeth, and to improve the efficiency of a harrow.

My invention consists in the construction and combination of tooth-bars, detachable teeth, and tooth-fastening devices, as hereinafter set forth, pointed out in my claims, and illustrated in the accompanying drawings, in which—

Figure 1:
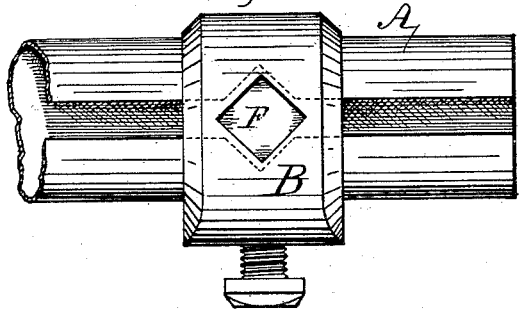
Figure 2:
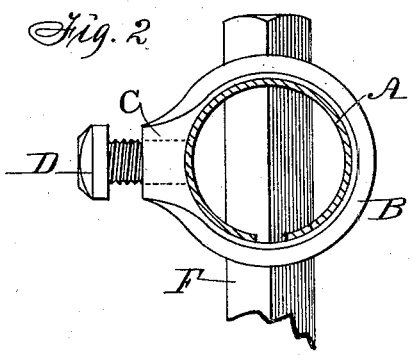
Figure 3:
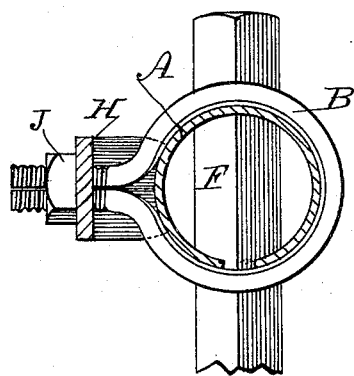
Figure 4:
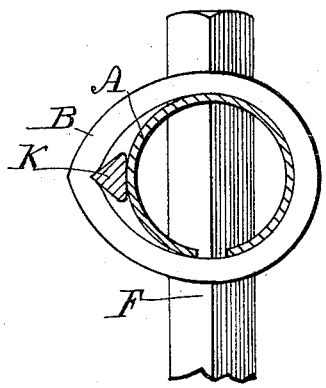
Figure 5:
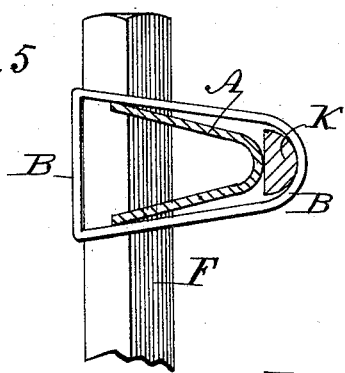
Figure 6:
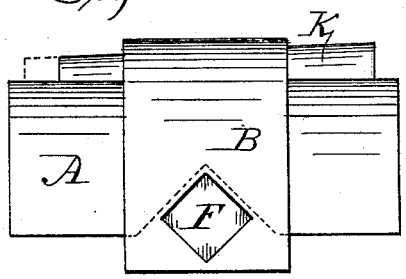

Figure 1 shows a piece of a bar in an inverted position and a tooth-fastening device attached thereto. Fig. 2 is an end view of Fig. 1, showing a part of a tooth attached. Figs. 3 and 4 show modified forms of the tooth-fastening device attached to the tooth-bar. Figs. 5 and 6 show modified forms of the tooth-bar and tooth-fastening device.

A (shown in Figs. 1, 2, 3, and 4) represents a tooth-bar made of iron or steel plate metal rolled into the form of a cylinder in such a manner that its edges will be parallel and some distance apart.

In Figs. 5 and 6 the plate is U-shaped in its cross-section.

B (shown in Figs. 1 and 2) is a metal clip, preferably malleable iron cast solid and adapted in shape and size to fit and slide upon the tubular bar A. It has a lateral extension and screw-seat C, adapted to receive a set-screw D. It also has coinciding angular perforations in its opposite sides adapted to admit the passage of a tooth F, that extends through the clip and bar, which bar has notches in its parallel edges coinciding with the perforations in the clip, as indicated by dotted lines in Figs. 1 and 6. By means of the screw and clip the bar can be readily contracted to clamp the tooth and retain it rigidly fixed in the bar.

In Fig. 3 the clip B is made of wrought metal and so shaped that its ends terminate in a split screw-threaded shank, upon which a washer H and a nut J are placed in such a manner that the washer will engage the bar A when the nut is drawn, as required to contract the flexible bar and to clamp both fast to the bar.

In Fig. 4 the clip B is solid and has a groove in its inside adapted to admit a wedge or key k in such a manner that the bar will be contracted, as required to clamp a tooth fast, by simply driving the key longitudinally on the outside of the bar, as indicated by dotted lines in Fig. 5.

The size and weight of the bar that can be thus contracted to clamp and hold teeth may vary, and any number of them may be connected with a frame to produce a drag-harrow of any shape and size and weight desired.

I claim as my invention—

1. A tooth-bar for harrows, consisting of a tubular bar that has a longitudinal opening extending from one end to the other and coinciding perforations or notches at intervals adapted to admit teeth to be clamped fast therein by clamping the bar.

2. In a harrow, the combination of a clip B and a tooth with a tubular tooth-bar A, having an opening extending its entire length and coinciding perforations or notches, substantially as shown and described, for the purposes stated.

JAMES T. HAMILTON.

Witnesses:
WILLIAM PENROSE,
ABRAHAM H. STUTSMAN.